United States Patent
Uziel et al.

(10) Patent No.: US 8,408,159 B2
(45) Date of Patent: Apr. 2, 2013

(54) PORTABLE APPARATUS FOR MILKING ANIMALS

(75) Inventors: Moshe Uziel, Oshrat (IL); Zvi Verfel, Ramat HaGolan (IL)

(73) Assignees: TRM Tiram Import Agencies Ltd., Oshrat (IL); Zvi Verfel, Givat Yoav (IL)

( * ) Notice: Subject to any disclaimer, the term of this patent is extended or adjusted under 35 U.S.C. 154(b) by 185 days.

(21) Appl. No.: 12/988,315

(22) PCT Filed: Apr. 26, 2009

(86) PCT No.: PCT/IL2009/000445
§ 371 (c)(1),
(2), (4) Date: Oct. 17, 2010

(87) PCT Pub. No.: WO2009/130703
PCT Pub. Date: Oct. 29, 2009

(65) Prior Publication Data
US 2011/0036296 A1    Feb. 17, 2011

Related U.S. Application Data

(60) Provisional application No. 61/047,640, filed on Apr. 24, 2008.

(51) Int. Cl.
*A01J 5/003* (2006.01)
(52) U.S. Cl. .............. 119/14.08; 604/74; 119/14.38; 119/14.42
(58) Field of Classification Search ............ 119/14.2, 119/14.37–14.38, 14.42, 42, 46, 47, 54, 14.46, 119/14.47, 14.54, 14.08; 604/73–74
See application file for complete search history.

(56) References Cited

U.S. PATENT DOCUMENTS

| | | | | |
|---|---|---|---|---|
| 1,486,671 | A * | 3/1924 | Maes | 119/14.37 |
| 2,361,970 | A | 11/1944 | Schmitt | |
| 2,404,068 | A * | 7/1946 | Hinman | 119/14.45 |
| 2,404,069 | A * | 7/1946 | Hinman | 119/14.4 |
| 2,678,627 | A | 5/1954 | Kingston | |
| 4,034,711 | A | 7/1977 | Bender et al. | |
| 4,190,021 | A * | 2/1980 | Reisgies | 119/14.44 |
| 4,403,569 | A | 9/1983 | Bennett | |
| 4,710,165 | A * | 12/1987 | McNeil et al. | 604/67 |
| 5,616,125 | A * | 4/1997 | Jelks | 604/74 |
| 5,776,098 | A * | 7/1998 | Silver et al. | 604/74 |
| 6,702,167 | B2 * | 3/2004 | Annis | 224/576 |

FOREIGN PATENT DOCUMENTS

| | | |
|---|---|---|
| DE | 849777 | 9/1952 |
| DE | 1677490 | 6/1954 |

* cited by examiner

*Primary Examiner* — Rob Swiatek
*Assistant Examiner* — Ebony Evans
(74) *Attorney, Agent, or Firm* — Dekel Patent Ltd.; David Klein

(57) ABSTRACT

A portable apparatus for milking animals, that can be carried by a person to any location, preferably in a bag such as a hand bag, side bag or backpack. The portable apparatus includes a carrying device, a power unit including a vacuum pipeline, a milk pipeline having a milk reservoir, and a milking claw unit, having one or more teat-cups. The vacuum pipeline provides suction force to the teat-cups that operatively draw milk from the animal udder. The milk pipeline operatively connects the teat-cups to the milk reservoir. Vacuum force further creates partial vacuum in the milk reservoir, and along with gravity the drawn milk flows to the milk reservoir. The portable apparatus can be used to milk animals located at sites accessible only by foot. The portable apparatus can be used to milk colostrums after parturition, and to milk animals having infected udder/teat.

16 Claims, 5 Drawing Sheets

PORTABLE APPARATUS FOR MILKING ANIMALS

CROSS REFERENCE TO RELATED APPLICATIONS

This application claims the benefit from U.S. provisional application 61/047,640 filed Apr. 24, 2008, the disclosure of which is included herein by reference.

FIELD OF THE INVENTION

This invention relates to apparatus for milking animals and more particularly the present invention relates to an apparatus for milking animals, at any location, that can be carried by the apparatus operator in a bag such as a hand bag, side bag or a backpack.

BACKGROUND AND PRIOR ART

Teat-cup carriers are known for use with movable feed platforms, the platforms being wheeled and either motorized or towed. Prior art systems are heavy and cannot be hand carried by a single person. Example prior art devices of this type are known from U.S. Pat. No. 4,508,058, and U.S. Pat. Nos. 6,981,467, 7,231,886, German Patent No. 20318152U, Brazilian Patent No. 8500325U and French Patent No. 2649858.

When an animal gives birth, colostrums milk must be drawn from the animal in the first two day after parturition, to feed the new born. Often the milking has to be done away from the shed, where it is difficult to access with a heavy milking unit. In other cases, when an animal is sick, for example with of udder mastitis, the animal must be milked separately to prevent the spreading of the contagious illness. Often, the animal is milked to the ground, as illustrated in FIG. 1.

There is therefore a need for and it would be advantageous to have a portable apparatus for milking animals that is in small form that can be carried by a person to any location, preferably in a bag such as a backpack.

SUMMARY OF THE INVENTION

According to the teachings of the present invention there is provided a portable apparatus for milking animals, that is in small form and that can be carried by a person to any location, preferably in a bag such as a hand bag, side bag or backpack. The portable apparatus can be used to milk animals at any location including sites accessible only by foot. The portable apparatus can be used to milk colostrums after parturition, and to milk animals having infected udder/teat.

The portable apparatus includes a carrying device, a vacuum pipeline, a milk pipeline and a milking claw unit, having one or more teat-cups. The vacuum pipeline includes a power unit having a vacuum pump and a power source, and a pulsator. The vacuum pipeline provides suction force to the teat-cups that operatively draw milk from the animal udder. The milk pipeline includes a milk reservoir, operatively connected to the teat-cups with a flexible pipe.

The vacuum pipeline operatively connects the vacuum pump to the teat-cups. The pulsator operatively regulates the suction force created by the vacuum pump, and operatively draws milk from the animal through the teat-cups being respectively attached to the teats of the animal. Vacuum force further creates partial vacuum in the milk reservoir, and along with gravity the drawn milk flows to the milk reservoir.

In embodiments of the present invention, the power unit further includes a milk pump, connected to the teat-cups by a flexible milk pipe. Thereby, the drawn milk is directed by the milk pump from each of the teat-cups to the milk reservoir.

In variations of the present invention, the milk pump is connected to the milk reservoir by a one-way valve, disposed between the milk reservoir and the milk pump, thereby preventing return of milk from the milk reservoir to the milk pump.

In embodiments of the present invention, the power unit further includes a regulator and a vacuum level gage. The regulator, assisted by the vacuum level gage, enables the person operating the portable apparatus of the present invention, to adjust milking related parameters, such as suction force, adaptive to the type of the animal and to the health condition of the udder/teat of the animal. The health condition includes animals suffering from an illness in the udder/teat, such as udder mastitis, and animals after parturition and thereby providing colostrums milk.

In embodiments of the present invention, the power unit further includes an intermediate vacuum container, wherein the intermediate vacuum container is disposed on the vacuum pipeline proximal to the vacuum pump, thereby stabilizing the vacuum force.

In embodiments of the present invention, the power unit further includes an intermediate vacuum milk container disposed between the milk pump and each of the one or more teat-cups, wherein a second flexible vacuum pipe operatively connects the vacuum pump and the intermediate vacuum milk container, thereby creating partial vacuum in the intermediate vacuum milk container. Each of the teat-cups is connected to the intermediate vacuum milk container by the flexible milk pipe. Thereby, the drawn milk is directed, through the flexible milk pipe, by gravity and by the partial vacuum from each teat-cup to the milk intermediate vacuum milk container. The milk pump then transfers the drawn milk from the intermediate vacuum milk container to the milk reservoir. In variations of the present invention, the intermediate vacuum milk container includes a one-way valve, thereby milk from the intermediate vacuum milk container does not return to the vacuum pump.

In embodiments of the present invention, the power source is an electric power source, preferably a DC power source selected from the group of electric power sources consisting of: a battery, a rechargeable battery, an external DC electric source and an external AC electric source coupled with a DC converting device such as a transformer.

In embodiments of the present invention, the flexible milk pipe includes a cup regulator disposed proximal to the corresponding teat-cup, wherein the cup regulator closes the flexible milk pipe by sensing when the one or more of the teat-cups is not attached to the respective one or more teats.

Preferably, the milk reservoir and/or the intermediate vacuum milk container are made of clear materials, to enable the person operating the portable apparatus of the present invention, to inspect the drawn milk.

The milk reservoir is selected from a group of containers a disposable plastic bag, a bottle, a conventional milk container, or any other container.

The carrying device is selected from a group of carriers including: a bag, a side bag, a hand bag or a backpack. The bag may include one or more carrying straps.

An aspect of the present invention is to provide a portable milking apparatus for milking animals selected from the group of mammals including: a cow, a horse, a sheep, a goat, a camel, a bos grunniens, a llama, an alpaca and others.

An aspect of the present invention is to provide a portable milking apparatus that reduces the reoccurrences of illnesses, such as udder mastitis, and prevent to the contagious illness from spreading.

An aspect of the present invention is to provide a portable milking apparatus that enables a fast access to milk Colostrums from animals after parturition, at any location.

An aspect of the present invention is to provide a portable milking apparatus that provides easy access to animals that need to be milked, when in grazing sites that have terrain which is difficult for prior art portable prior art to reach.

BRIEF DESCRIPTION OF THE DRAWINGS

The present invention will become fully understood from the detailed description given herein below and the accompanying drawings, which are given by way of illustrations and examples only and thus not limitative of the present invention, and wherein.

DESCRIPTION OF EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The methods and examples provided herein are illustrative only and not intended to be limiting.

By way of introduction, the principal intentions of the present invention include proving portable apparatus for milking animals that are in small form and that can be carried by a person to any location, including grazing areas that are only accessible by foot, where only manual milking is available. The portable milking apparatus of the present invention is preferably carried in a bag such as a hand bag, a side bag or a backpack. The portable milking apparatus enables a fast access to milk colostrums from animals in the first two days after parturition, at any location. The portable milking apparatus also reduces the reoccurrences of illnesses, such as udder mastitis, and prevent to the contagious illness from spreading, by providing a solution for milking such ill animals. The portable milking apparatus is adaptable to any kind of milk rendering mammal animals, selected from the group including cows, female camels, sheep, bos grunniens, horses, goats, llamas, alpacas and other mammals.

Figure 1:
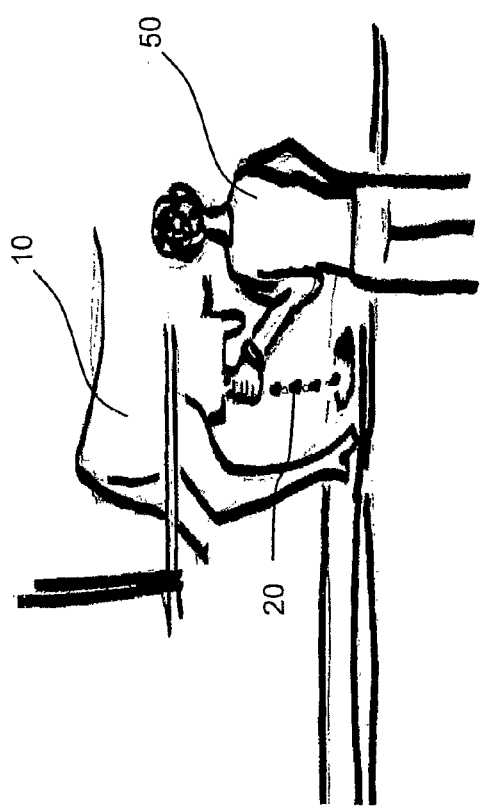
FIG. 1 (prior art) illustrates milking an ill animal.
Figure 2:
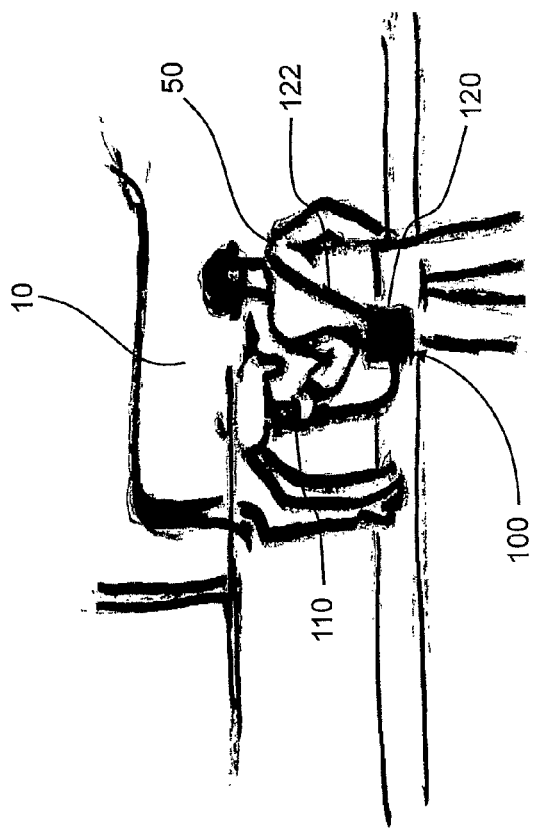
FIG. 2 illustrates milking an ill animal with a portable apparatus for milking animals, according to embodiments of the present invention.
Figure 3:
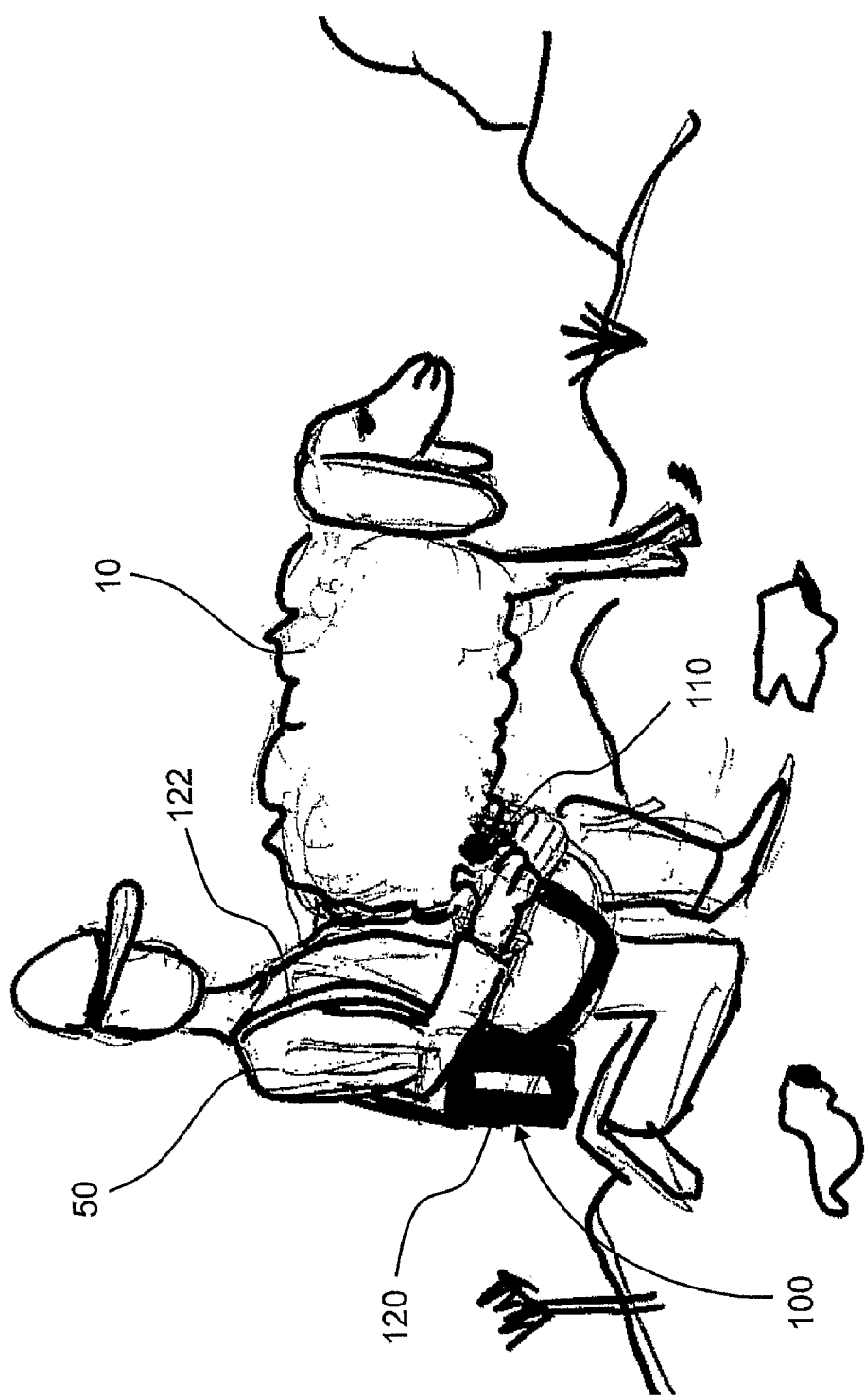
FIG. 3 illustrates milking an animal with a portable apparatus for milking animals, according to embodiments of the present invention, on location at a grazing site with limited accessibility.

FIG. 2 illustrates milking ill animal 10 with portable apparatus 100 for milking animals, according to embodiments of the present invention. Portable milking apparatus 100 further provides easy access to animals 10 that need to be milked, when in grazing sites that have terrain which is difficult for prior art portable prior art to reach. FIG. 3 illustrates milking animal 10 with a portable apparatus for milking animals 100, according to embodiments of the present invention, on location at a grazing site by a single person 50.

Figure 4:
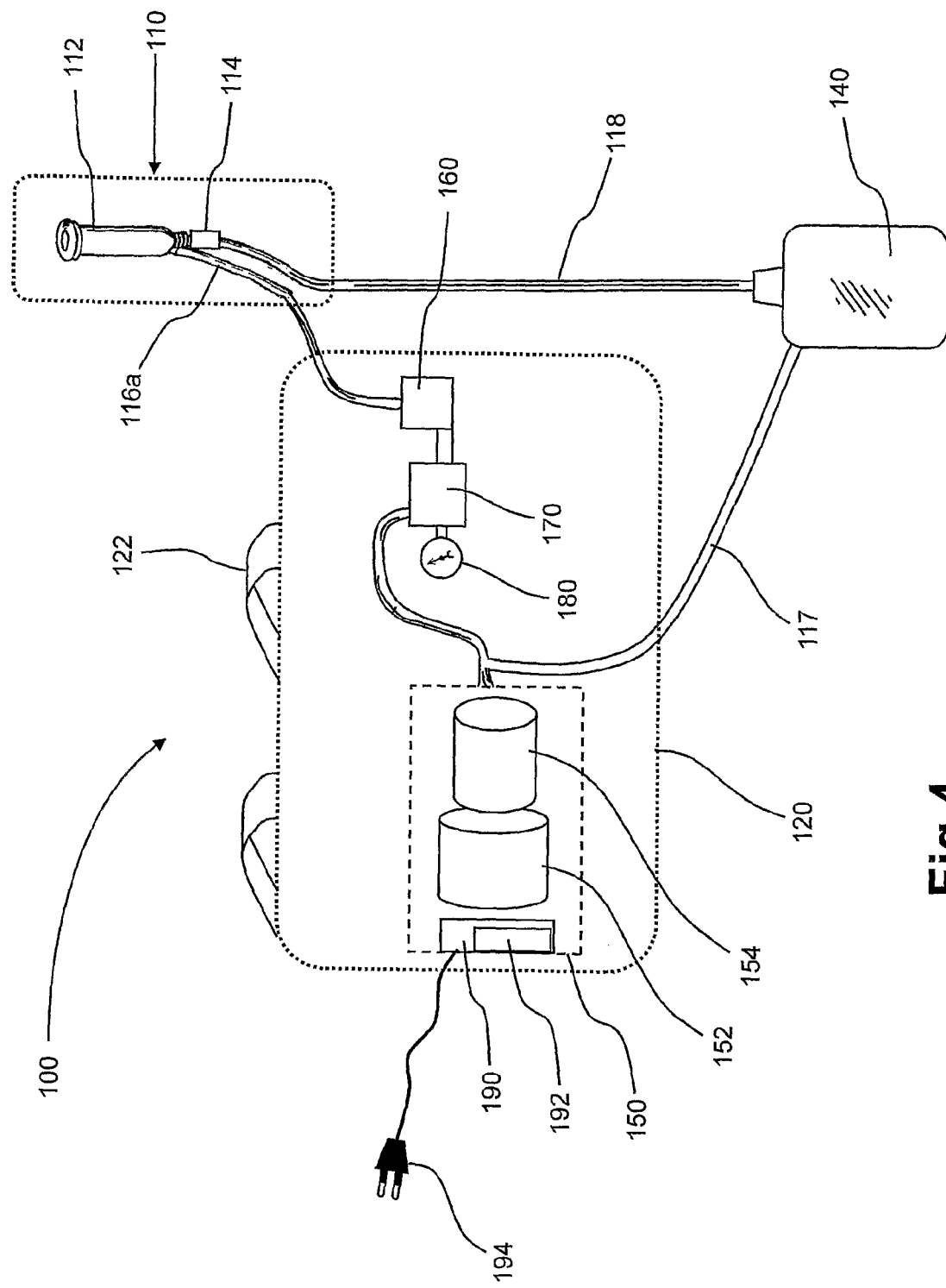
FIG. 4 is schematic illustration of a portable apparatus for milking animals, according to embodiments of the present invention.

Reference is now made to FIG. 4, which schematically illustrates portable apparatus for milking animals 100, according to embodiments of the present invention. Portable milking apparatus 100 includes power unit 150, milk reservoir 140 and milking claw unit 110, having one or more teat-cups 112. Portable milking apparatus 100 further includes carrying device 120 such as a bag or a backpack, wherein power unit 150, milk reservoir 140 and/or milking claw unit 110 are either attached or detached to carrying device 120.

Power unit 150 includes motor 152, vacuum pump 154, pulsator 160, power source 190, and preferably vacuum level gage 180 and regulator 170. Power source 190 is preferably a DC power source such as battery 192. Preferably, battery 192 includes one or more rechargeable batteries. Optionally, power source 190 can also be any external electric source 194, including an AC power source coupled with an AC to DC converting device such as a transformer. In variations of the present invention, motor 152, vacuum pump 154 are integrated into a single unit.

Milking claw unit 110 has two type of pipelines lead to and from each teat-cup 112: a vacuum pipeline and a milk pipeline. Each teat-cup 112 has two flexible pipes operatively attached to: first vacuum pipe 116a is connected to pulsator 160, both being on the vacuum pipeline; and milk pipe 118 is connected to milk reservoir 140, both forming the milk pipeline. On the milk pipeline, proximal to teat-cup 112, cup regulator 114 is disposed to sense when teat-cup 112 is attached to a teat to perform milking by the vacuum force. When cup regulator 114 senses that teat-cup 112 is not attached to a teat, cup regulator 114 closes the milk pipeline, and thereby prevents unwanted suction of milk from milk reservoir 140.

Milk reservoir 140, can be any type of container, including a disposable plastic bag, a bottle, a conventional milk container, or any other container. The disposable plastic bags are needed in particular, for milking Colostrums from animals 10 after parturition. Milk reservoir 140 is preferably made of clear materials, to enable operator 50 to monitor and inspect the quality of the drawn milk, for example, detecting blood in the milk.

Second flexible vacuum pipe 117 operatively connects vacuum pump 154 and milk reservoir 140, thereby creating partial vacuum inside milk reservoir 140. Teat-cups 112 are connected to milk reservoir 140 by milk pipe 118. Thereby, the drawn milk is directed, by gravity and by the partial vacuum inside milk reservoir 140, from teat-cups 112 to milk reservoir 140.

Vacuum pump 154, operatively coupled with motor 152, generates the suction force needed to draw milk from the udder of animal 10 being milked. Pulsator 160 regulates the suction of milk from the teat of animal 10, to which teat-cup 112 is attached. For example, pulsator 160 creates suction pulses that mimic the suction a baby animal. Regulator 170 enables adjustment of milking related parameters, such as suction force level, adaptive to the type of animal 10 being milked and/or to the health condition of the udder/teat of the animal. For example, often, animal 10 suffers from an udder/teat illness, such as udder mastitis or any other infection/illness. Milking such an udder/teat infected animal 10 with portable apparatus 100, accelerates the healing of animal 10. Vacuum level gage 180 monitors the suction force, enabling operator 50 to adjust the suction force according to the size and health condition of animal 10.

Figure 5:
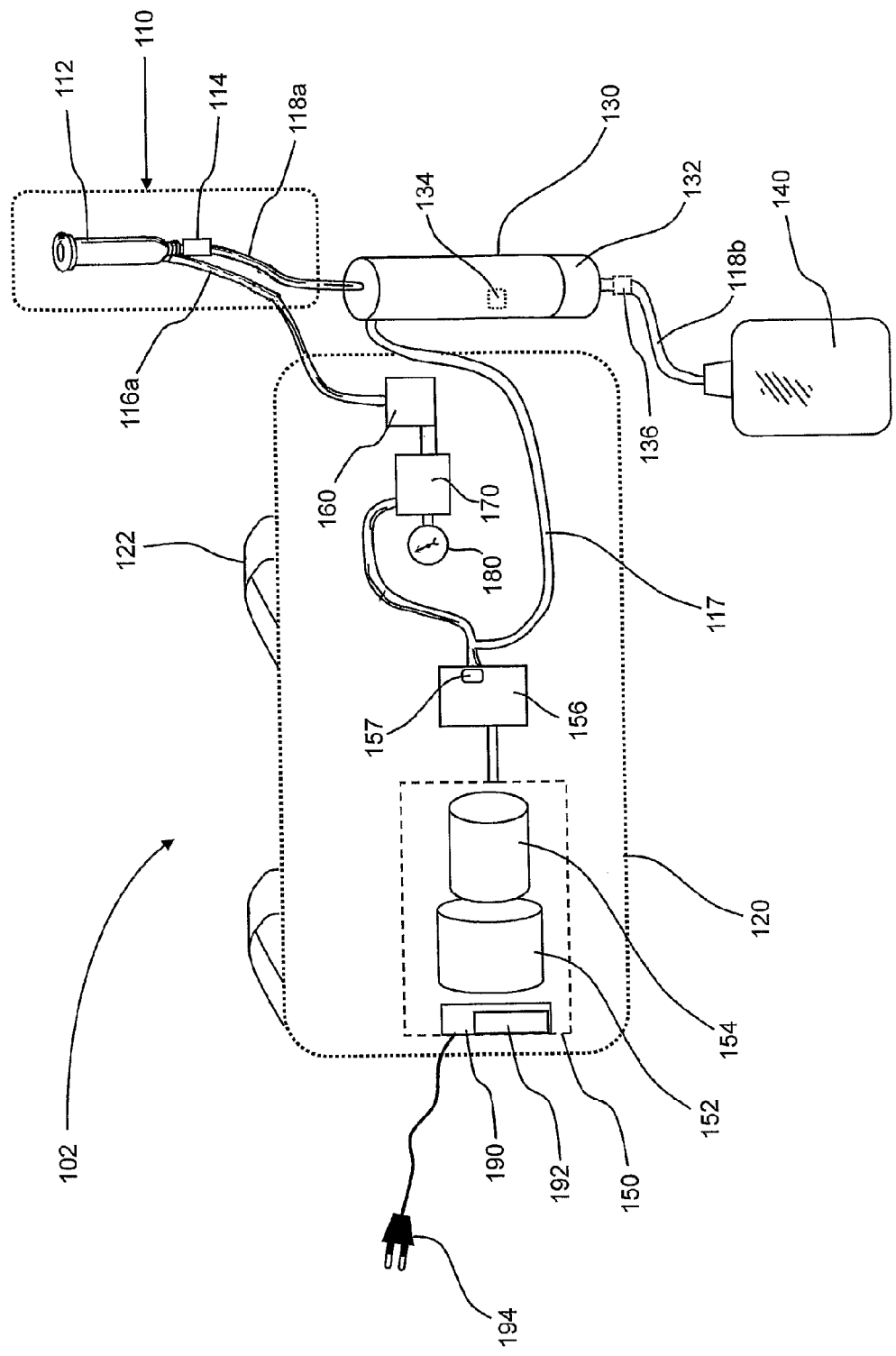
FIG. 5 is schematic illustration of a portable apparatus for milking animals, according to other embodiments of the present invention, having an intermediate vacuum container and an intermediate vacuum milk container.

Reference is now made to FIG. 5, which schematically illustrates portable apparatus for milking animals 102, according to other embodiments of the present invention. Portable milking apparatus 102 includes power unit 150, milk reservoir 140 and milking claw unit 110, having one or more teat-cups 112. Portable milking apparatus 102 further includes carrying device 120 such as a bag or a backpack, wherein power unit 150, milk reservoir 140 and/or milking claw unit 110 are either attached or detached to carrying device 120.

Power unit 150 includes motor 152, vacuum pump 154, intermediate vacuum container 156, intermediate vacuum milk container 130, milk pump 132, pulsator 160, power source 190, and preferably vacuum level gage 180 and regulator 170. Power source 190 is preferably a DC power source such as battery 192. Preferably, battery 192 includes one or more rechargeable batteries. Optionally, power source 190 can also be any external electric source 194, including an AC power source coupled with an AC to DC converting device such as a transformer.

As in portable apparatus 100, Milking claw unit 110 has two type of pipelines lead to and from each teat-cup 112: a vacuum pipeline and a milk pipeline. Each teat-cup 112 has two flexible pipes operatively attached to: first vacuum pipe 116a is connected to pulsator 160, both being on the vacuum pipeline; and milk pipe segment 118a is connected to intermediate vacuum milk container 130. To complete the milk pipeline milk pipe segment 118b connects intermediate vacuum milk container 130 to milk reservoir 140. Intermediate vacuum milk container 130 is preferably made of clear materials, to enable operator 50 to monitor and inspect the quality of the milk, for example, detecting blood in the milk.

Milk reservoir 140, can be any type of container, including a disposable plastic bag, a bottle, a conventional milk container, or any other container. The disposable plastic bags are needed in particular, for milking Colostrums from animals 10 after parturition. Optionally, to ensure that milk from reservoir 140 does not return to milk container 130, one-way valve 136 is preferably disposed between reservoir 140 and milk container 130. Milk reservoir 140 is preferably made of clear materials, to enable operator 50 to monitor and inspect the quality of the drawn milk, for example, detecting blood in the milk.

Second flexible vacuum pipe 117 operatively connects intermediate vacuum container 156 and milk reservoir 140, thereby creating partial vacuum inside milk reservoir 140. Teat-cups 112 are connected to milk reservoir 140 by milk pipe 118. Thereby, the drawn milk is directed, by gravity and by the partial vacuum inside milk reservoir 140, from teat-cups 112 to milk reservoir 140.

Vacuum pump 154, operatively coupled with motor 152, generates the suction force needed to draw milk from the udder of animal 10 being milked. Pulsator 160 regulates the suction of milk from the teat of animal 10, to which teat-cup 112 is attached. For example, pulsator 160 creates suction pulses that mimic the suction a baby animal. Regulator 170 enables adjustment of milking related parameters, such as suction force level, adaptive to the type of animal 10 being milked and/or to the health condition of the udder/teat of the animal. To ensure operational stability of the suction force, intermediate vacuum container 156 is disposed on the vacuum pipeline, proximal to vacuum pump 154. Furthermore, to ensure that milk from intermediate vacuum milk container 130 does not return to vacuum pump 154, intermediate vacuum container 156 includes one-way valve 157, such as a float valve. Vacuum level gage 180 monitors the suction force, enabling operator 50 to adjust the suction force according to the size and health condition of animal 10.

Milk pump 132 is operatively connected to intermediate vacuum milk container 130, typically to the bottom of intermediate vacuum milk container 130. Optional sensor 134 is designed to activate milk pump 132, for example, when the level of the milk in intermediate vacuum milk container 130 reaches a predefined level. Optionally, milk pump 132 is manually activated by operator 50. Milk pump 132 is further connected to milk reservoir 140, directing the acquired milk from intermediate vacuum milk container 130 to milk reservoir 140. Milk reservoir 140, can be any type of container, including a disposable plastic bag, a bottle, a conventional milk container, or any other container. The disposable plastic bags are useful, in particular, for milking colostrums from animals 10 after parturition. To ensure that milk from milk reservoir 140 does not return to intermediate vacuum milk container 130, one-way valve 136 is preferably disposed between milk reservoir 140 and intermediate vacuum milk container 130.

Carrying device 120 can be any bag such as a side bag, a hand bag or a backpack and can also be placed on the ground. The bag can be designed to hold multiple disposable plastic bags 120, a single teat-cup 112 and/or a cluster of teat-cups 112, replaceable battery and/or any other related accessory or any other item. Bag 120 may conveniently include one or more carrying straps 122.

Figure 6:
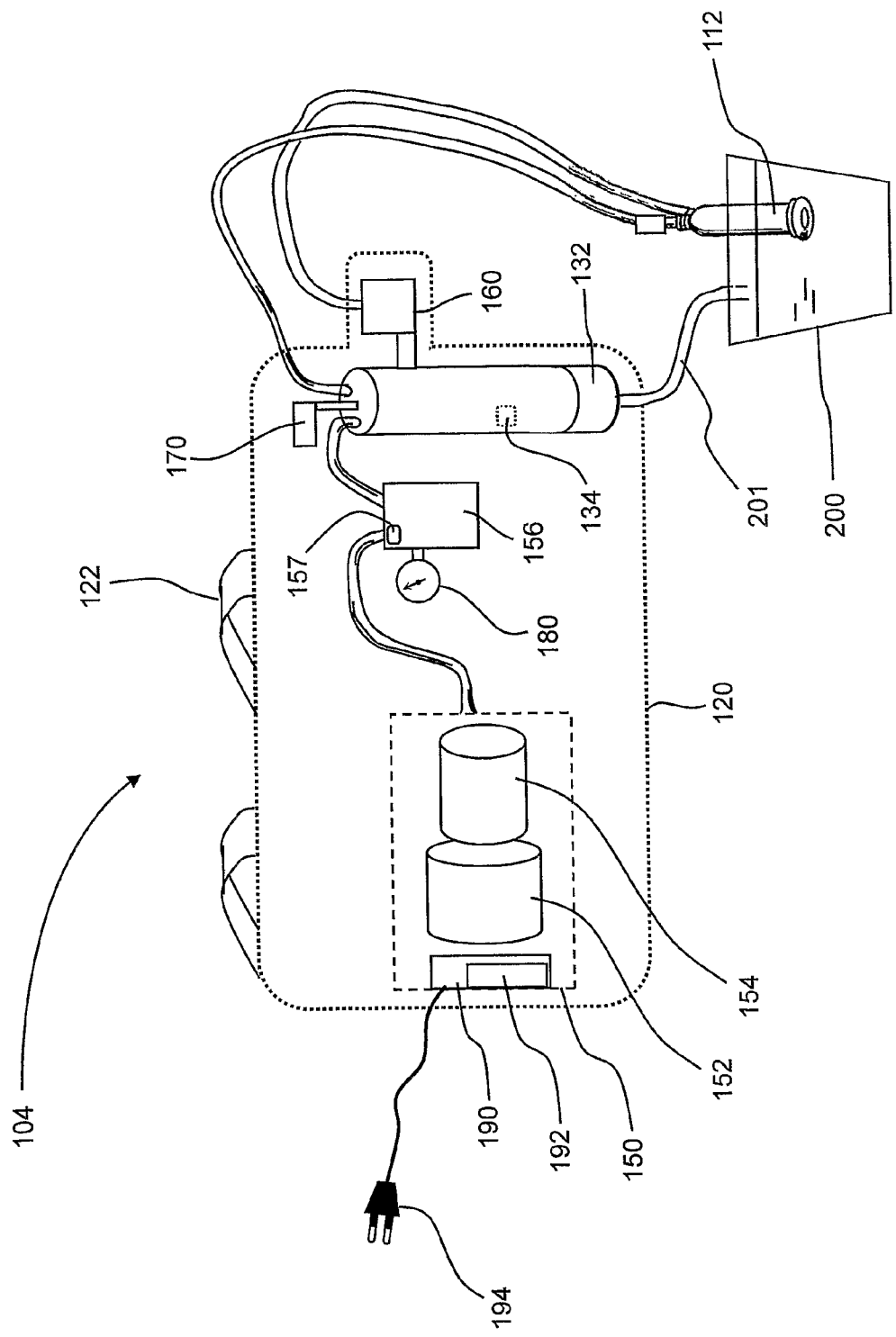
FIG. 6 is schematic illustration a portable apparatus for milking animals, according to embodiments of the present invention, performing sterilization of the milking claw unit.

An aspect of the present invention is to provide cleaning and sterilization method to clean and sterilize portable milking apparatus 100/102. An example sterilization method is illustrated in FIG. 6, showing a container, such as bucket 200, containing cleaning and sterilization and being used to sterilize portable milking apparatus 104, wherein portable milking apparatus 104 is according to variations of the present invention. One end of hose 201 is connected to the bottom of milking pump 132 and the other end of hose 201 is disposed inside bucket 200. Teat-cup 112 is also disposed inside bucket 200. Intermediate vacuum milking pump 130 then operated whereas teat-cup 112 sucks the sterilization liquid from bucket 200 into intermediate vacuum milking pump 130 and then the sterilization liquid returns to bucket 200 through hose 201. In another embodiment of the present invention an aerosol spray containing sterilization spray is attached to portable milking apparatus 100/102 and used to sterilize teat-cup(s) 112 and the milk lines of portable milking apparatus 100/102.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A portable apparatus for milking animals, operatively carryable by a person, comprising:
   a) a carrying device, wherein said carrying device comprises a bag or a backpack;
   b) a vacuum pipeline comprising:
   i. a power unit including:
   A. a motor;
   B. a vacuum pump; and
   C. a power source comprising a rechargeable battery;

ii. a pulsator;

c) a milk pipeline and a milk reservoir; and d) a milking claw unit, having one or more teat-cups, wherein said vacuum pump is operatively coupled with said motor;

wherein said vacuum pipeline operatively connects said vacuum pump to said one or more teat-cups;

wherein said milk pipeline operatively connects said one or more teat-cups to said milk reservoir;

wherein said vacuum pump creates a suction force that operatively draws milk from an animal being milked through said one or more teat-cups being respectively attached to one or more teats of said animal;

wherein said pulsator operatively regulates said suction force; wherein each of said one or more teat-cups is connected to said pulsator by a first flexible vacuum pipe, thereby said regulated vacuum force can be applied to said one or more teats of said animal;

wherein a second flexible vacuum pipe operatively connects said vacuum pump and said milk reservoir, thereby creating partial vacuum in said milk reservoir; and wherein each of said one or more teat-cups is connected to said milk reservoir by a flexible milk pipe, thereby said drawn milk is directed, through said flexible milk pipe, by gravity and by said partial vacuum from each of said one or more teat-cups to said milk reservoir.

2. The portable apparatus of claim 1, further comprising e) a milk pump, wherein each of said one or more teat-cups is connected to said milk pump by said flexible milk pipe, thereby said drawn milk is directed by said milk pump from each of said one or more teat-cups to said milk reservoir.

3. The portable apparatus of claim 2, wherein said milk pump is connected to said milk reservoir by a one-way valve, disposed between said milk reservoir and said milk pump, thereby preventing return of milk from said milk reservoir to said milk pump.

4. The portable apparatus of claim 2, further comprising viii. an intermediate vacuum milk container, wherein a second flexible vacuum pipe operatively connects said vacuum pump and said intermediate vacuum milk container, thereby creating partial vacuum in said intermediate vacuum milk container;

wherein said intermediate vacuum milk container is disposed between said milk pump and each of said one or more teat-cups; wherein each of said one or more teat-cups is connected to said intermediate vacuum milk container by said flexible milk pipe, thereby said drawn milk is directed, through said flexible milk pipe, by gravity and by said partial vacuum from each of said one or more teat-cups to said milk intermediate vacuum milk container; and wherein said milk pump transfers the drawn milk from said intermediate vacuum milk container to said milk reservoir.

5. The portable apparatus of claim 4, wherein said intermediate vacuum milk container comprises a one-way valve, thereby milk from said intermediate vacuum milk container does not return to said vacuum pump.

6. The portable apparatus of claim 4, wherein said intermediate vacuum milk container is made of clear materials, to enable said person to inspect said drawn milk.

7. The portable apparatus of claim 1, further comprising iv. a regulator; and v. a vacuum level gage, wherein said regulator, assisted by said vacuum level gage, enables said person to adjust milking related parameters, adaptive to the type of said animal and to the health condition of the udder/teat of said animal.

8. The portable apparatus of claim 7, wherein said milking related parameters includes suction force.

9. The portable apparatus of claim 7, wherein said health condition includes an animal suffering from an illness in said udder/teat of said animal, such as udder mastitis.

10. The portable apparatus of claim 7, wherein said health condition includes an animal after parturition, and thereby providing colostrums milk.

11. The portable apparatus of claim 1, further comprising vii. an intermediate vacuum container, wherein said intermediate vacuum container is disposed on said vacuum pipeline proximal to said vacuum pump, thereby stabilizing said vacuum force.

12. The portable apparatus of claim 11, further comprising unit further comprises: viii. an intermediate vacuum milk container, wherein a second flexible vacuum pipe operatively connects said vacuum pump and said intermediate vacuum milk container, thereby creating partial vacuum in said intermediate vacuum milk container;

wherein said intermediate vacuum milk container is disposed between a milk pump and each of said one or more teat-cups; wherein each of said one or more teat-cups is connected to said intermediate vacuum milk container by said flexible milk pipe, thereby said drawn milk is directed, through said flexible milk pipe, by gravity and by said partial vacuum from each of said one or more teat-cups to said milk intermediate vacuum milk container; and wherein said milk pump transfers the drawn milk from said intermediate vacuum milk container to said milk reservoir.

13. The portable apparatus of claim 1, wherein said flexible milk pipe comprises a cup regulator disposed proximal to corresponding one or more teat-cup, wherein said cup regulator closes said flexible milk pipe by sensing when said one or more of said teat-cups is not attached to said respective one or more teats.

14. The portable apparatus of claim 1, wherein said milk reservoir is made of clear materials, to enable said person to inspect said drawn milk.

15. The portable apparatus of claim 1, wherein said milk reservoir is selected from a group of containers comprising a disposable plastic bag, a bottle, and a conventional milk container.

16. The portable apparatus of claim 1, wherein said bag includes one or more carrying straps.

* * * * *